(12) United States Patent
Sorsby et al.

(10) Patent No.: US 9,059,768 B1
(45) Date of Patent: Jun. 16, 2015

(54) INTERFERENCE CANCELLATION SYSTEM AND METHOD

(71) Applicants: William B. Sorsby, Cedar Rapids, IA (US); Timothy E. Snodgrass, Palo, IA (US); James A. Stevens, Lucas, TX (US)

(72) Inventors: William B. Sorsby, Cedar Rapids, IA (US); Timothy E. Snodgrass, Palo, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/610,081

(22) Filed: Jan. 30, 2015

(51) Int. Cl.
*H04B 1/10* (2006.01)
*H04B 1/12* (2006.01)

(52) U.S. Cl.
CPC .............. *H04B 1/1036* (2013.01); *H04B 1/123* (2013.01)

(58) Field of Classification Search
CPC ............... H04L 25/03038; H04B 27/2647; H04B 1/1036; H04B 1/1081; H04B 2001/1045; H04B 2001/1063; H04B 2001/1072
USPC ......... 375/285, 316, 340, 346–350; 455/63.1, 455/67.13
See application file for complete search history.

(56) References Cited

U.S. PATENT DOCUMENTS

| | | | |
|---|---|---|---|
| 6,486,828 B1* | 11/2002 | Cahn et al. .................... | 342/363 |
| 8,396,177 B1* | 3/2013 | Morris .......................... | 375/346 |
| 8,755,756 B1* | 6/2014 | Zhang et al. ............... | 455/114.2 |
| 8,983,011 B2* | 3/2015 | Gollakota et al. ........... | 375/347 |
| 2005/0031060 A1* | 2/2005 | Thomas et al. ............... | 375/346 |
| 2007/0066226 A1* | 3/2007 | Cleveland et al. ........... | 455/63.1 |
| 2011/0002367 A1* | 1/2011 | Kummetz ..................... | 375/211 |
| 2011/0064172 A1* | 3/2011 | Olson et al. .................. | 375/346 |
| 2013/0202063 A1* | 8/2013 | Reial et al. ................... | 375/340 |
| 2015/0055568 A1* | 2/2015 | Jindal et al. .................. | 370/329 |

* cited by examiner

*Primary Examiner* — Khanh C Tran
(74) *Attorney, Agent, or Firm* — Angel N. Gerrdzhikov; Donna P. Suchy; Daniel M. Barbieri

(57) ABSTRACT

An interference cancellation system supports a dynamic operating range from maximum interfering signal level to the on-channel noise floor. The system uses a novel combination of analog and digital processing effectively cancelling 1) high-level interfering signal components, 2) low-level interfering noise, and 3) distortion components. The system employs an interrelated combination of cross-domain analog and digital processing techniques to defeat the inherent dynamic range limitations existing in either individual domain.

20 Claims, 8 Drawing Sheets

800

802 receiving a received signal, the received signal comprised of a desired signal and an interfering signal, the received signal received via a first receiver defining a reference path and a second receiver defining a receive path 804 filtering the received signal within the reference path, the filtering producing a reference analog filtered received signal 806 delaying the analog filtered received signal via at least one reference delay element, the at least one reference delay element having a variable delay based on at least a desired signal frequency, the at least one reference delay element receiving the reference analog filtered received signal and producing a wideband interference signal 808 eliminating an interference reference at the desired signal frequency via an elimination module within the reference path, the elimination module receiving the analog filtered received signal and producing a notched wideband interference signal 810 extracting an interference reference at the desired signal frequency via an extraction module within the reference path, the extraction module receiving each of the wideband interference signal and the notched wideband interference signal and producing a narrowband interference signal 812 filtering the received signal via at least one receive analog bandpass filtering element within the receive path, the filtering producing a receive analog filtered received signal 814 delaying the received signal via at least one receive delay element having a variable delay based at least on the desired signal frequency, the at least one receive delay element receiving the analog filtered received signal and producing a delayed received signal 816 subtracting the notched wideband interference signal from the delayed received signal via a subtraction module within the receive path, the subtraction module producing a desired signal inclusive of the narrowband interference signal 818 subtracting at least one of: the narrowband interference signal and a noise and distortion signal from the desired signal inclusive of the narrowband interference signal via a combiner, the combiner producing a desired output signal comprised of the desired signal without the interfering signal

FIG. 8

INTERFERENCE CANCELLATION SYSTEM AND METHOD

FIELD OF THE INVENTIVE CONCEPTS

Embodiments of the inventive concepts disclosed herein relate generally to cancellation of a first signal while allowing maximum throughput of a second signal. More particularly, embodiments of inventive concepts disclosed herein relate to system and method for large signal cancellation contemporaneous with full system sensitivity for small signal throughput.

BACKGROUND

The limited dynamic range of traditional interference cancellation systems has prevented them from affording full receive system sensitivity when high power cosite signals are present. High power interfering signals are almost always accompanied by noise and distortion effects which traditional cancellers are unable to eliminate. Fielded systems have typically ignored these secondary destructive components caused by distortion of the interfering signal which may present at the desired receive frequency and may desensitize the receiver. Such on-channel interference components, the noise and intermodulation products generated within either the transmitter or receiver, can easily remain well above the receive system sensitivity threshold thereby significantly desensitizing the receiver.

Three distinct interfering signal issues should be successfully addressed in order for an interference cancellation system to achieve essentially full cancellation and enable the receiving equipment to provide "full" sensitivity performance.

First, receiver overload must be prevented. Legacy interference cancellation system designs have traditionally accomplished this for signal levels on the order of 0 dBm but remain incapable for significantly higher levels.

Second, secondary noise and distortion components generated within the transmitter must be eliminated. A strong signal is likely to be accompanied by significant noise and distortion components, such as "phase noise" and intermodulation distortion, which can prevent full receive sensitivity performance. Neither analog nor digital interference cancellation systems have traditionally accomplished the task of eliminating such residual noise and distortion. Analog interference cancellation systems do not have the dynamic range needed due to internal generation of both noise and intermodulation distortion when large signals are present. Digital interference cancellation systems are even more restricted in dynamic range due to inherent limitations at both the analog to digital and digital to analog interfaces.

Third, internally generated noise and distortion within signal-cancelling circuits must be eliminated. The legacy approach to minimizing internally generated noise has been to provide the cancellation system an undistorted digital image of the interfering signal which is being transmitted. Besides the obvious interfacing complexity, this technique has the disadvantage that on-channel distortions within both the analog transmission chain and in the receiving cancellation circuits will still remain to degrade sensitivity even after the undistorted interfering signal components have been removed.

Therefore, a need remains for a system and method enabling large signal cancellation contemporaneous with full system sensitivity for small signal throughput.

SUMMARY

Accordingly, a system for large signal cancellation while allowing small signal reception may comprise a first receiver defining a reference path for a received signal, the received signal comprised of a desired signal and an interfering signal, the reference path configured to route the interfering signal, a second receiver defining a receive path for the received signal, the receive path configured to route the received signal, the reference path including: at least one reference analog bandpass filtering element configured for filtering the received signal and producing a reference analog filtered received signal, at least one reference delay element, the at least one reference delay element having a variable delay based on at least a desired signal frequency, the at least one reference delay element configured for receiving the reference analog filtered received signal and producing a wideband interference signal.

The system may include an elimination module configured for eliminating an interference reference at the desired signal frequency, the elimination module configured for receiving the analog filtered received signal and producing a notched wideband interference signal, an extraction module configured for extracting an interference reference at the desired signal frequency, the extraction module configured for receiving each of the wideband interference signal and the notched wideband interference signal and producing a narrowband interference signal.

The receive path may include at least one receive analog bandpass filtering element configured for filtering the received signal and producing a receive analog filtered received signal, at least one receive delay element having a variable delay based at least on the desired signal frequency, the at least one receive delay element configured for receiving the receive analog filtered received signal and producing a delayed received signal, a subtraction module configured for subtracting the notched wideband interference signal from the delayed received signal, the subtraction module configured for producing a desired signal inclusive of the narrowband interference signal, and a combiner configured for subtraction of at least one of: the narrowband interference signal and a noise and distortion signal from the desired signal inclusive of the digital narrowband interference signal, the combiner producing a desired output signal comprised of the desired signal without the interfering signal.

An additional embodiment of the inventive concepts disclosed herein may include a system wherein each of the at least one reference analog bandpass filtering element and the at least one receive analog bandpass filtering element further comprises: a plurality of individually switched bandpass filter elements, the plurality of individually switched bandpass filter elements switched based on the desired signal frequency.

An additional embodiment of the inventive concepts disclosed herein may include a system wherein the at least one reference delay element and the at least one receive delay element further include a delay configured to temporally align each of the reference path and the receive path.

An additional embodiment of the inventive concepts disclosed herein may include a system wherein the elimination module further comprises at least: an analog to digital converter, a digital fine delay adjust module, a digital notch filter, a digital to analog converter, an analog notch delay, and an analog elimination of the interference reference signal at the desired signal frequency.

An additional embodiment of the inventive concepts disclosed herein may include a system configured for incorporation with an operational radio, the incorporated system is integrated with the operational radio and at least one of: shares a power source with the operational radio and operates before a demodulation phase within the operational radio.

An additional embodiment of the inventive concepts disclosed herein may include a system wherein the at least one reference analog bandpass filtering element and the at least one receive analog bandpass filtering element are grouped within a first stage analog digital canceller.

An additional embodiment of the inventive concepts disclosed herein may include a system wherein each of the reference path and the receive path further includes an amplitude comparator coupled with a gain correction module upstream of the combiner the amplitude comparator comparing an amplitude of a signal within the reference path with a signal within the receive path and wherein each of the reference path and the receive path further includes a phase comparator coupled with a phase correction module upstream of the combiner the phase comparator comparing a phase of the signal within the reference path with the signal within the receive path.

An additional embodiment of the inventive concepts disclosed herein may include a system wherein the gain correction module and the phase correction module are grouped within a second stage digital canceller.

An additional embodiment of the inventive concepts disclosed herein may include a system wherein the first receiver is a jammer mounted antenna element onboard an aircraft and the second receiver is a communication antenna element mounted onboard the aircraft.

An additional embodiment of the inventive concepts disclosed herein may include a system further comprising a first high power analog combiner and a second high power analog combiner, each of the first and second high power analog combiner adding the notched wideband interference signal to at least one of the reference path and the receive path.

An additional embodiment of the inventive concepts disclosed herein may include a system further including an iterative amplitude and phase comparator receiving the desired signal and providing feedback to the gain correction module and the phase correction module.

An additional embodiment of the inventive concepts disclosed herein may include a method for large signal cancellation while allowing small signal reception, comprising receiving a received signal, the received signal comprised of a desired signal and an interfering signal, the received signal received via a first receiver defining a reference path and a second receiver defining a receive path.

The method may include filtering the received signal within the reference path, the filtering producing a reference analog filtered received signal, delaying the analog filtered received signal via at least one reference delay element, the at least one reference delay element having a variable delay based on at least a desired signal frequency, the at least one reference delay element receiving the reference analog filtered received signal and producing a wideband interference signal.

The method may further include eliminating an interference reference at the desired signal frequency via an elimination module within the reference path, the elimination module receiving the analog filtered received signal and producing a notched wideband interference signal, extracting an interference reference at the desired signal frequency via an extraction module within the reference path, the extraction module receiving each of the wideband interference signal and the notched wideband interference signal and producing a narrowband interference signal, filtering the received signal via at least one receive analog bandpass filtering element within the receive path, the filtering producing a receive analog filtered received signal, delaying the received signal via at least one receive delay element having a variable delay based at least on the desired signal frequency, the at least one receive delay element receiving the analog filtered received signal and producing a delayed received signal.

The method may further include subtracting the notched wideband interference signal from the delayed received signal via a subtraction module within the receive path, the subtraction module producing a desired signal inclusive of the narrowband interference signal, and subtracting at least one of: the narrowband interference signal and a noise and distortion signal from the desired signal inclusive of the narrowband interference signal via a combiner, the combiner producing a desired output signal comprised of the desired signal without the interfering signal.

An additional embodiment of the inventive concepts disclosed herein may include a method further including switching each of the at least one reference analog bandpass filtering element and the at least one receive analog bandpass filtering element via a plurality of individually switched bandpass filter elements, the plurality of individually switched bandpass filter elements switched based on the desired signal frequency.

An additional embodiment of the inventive concepts disclosed herein may include a method further including temporally aligning each of the reference path and the receive path via at least one reference delay element and the at least one receive delay element.

An additional embodiment of the inventive concepts disclosed herein may include a method further including cancelling the interfering signal before a demodulation phase within an operational radio, the cancelling including at least one of: incorporation within the operational radio and sharing a power source with the operational radio.

An additional embodiment of the inventive concepts disclosed herein may include a method further including grouping each of the at least one reference analog bandpass filtering element and the at least one receive analog bandpass filtering element within a first stage analog digital canceller.

An additional embodiment of the inventive concepts disclosed herein may include a method wherein each of the reference path and the receive path further includes an amplitude comparator coupled with a gain correction module upstream of the combiner, the amplitude comparator comparing an amplitude of a signal within the reference path with a signal within the receive path and wherein each of the reference path and the receive path further includes a phase comparator coupled with a phase correction module upstream of the combiner, the phase comparator comparing a phase of the signal within the reference path with the signal within the receive path.

An additional embodiment of the inventive concepts disclosed herein may include a method further including grouping at least the gain correction module and the phase correction module within a second stage digital canceller.

An additional embodiment of the inventive concepts disclosed herein may include a method further including receiving the received signal via a jammer mounted antenna element onboard an aircraft and via a communication antenna element mounted onboard the aircraft.

An additional embodiment of the inventive concepts disclosed herein may include a method further comprising adding the notched wideband interference signal to at least one of the reference path and the receive path via at least a first high power analog combiner and a second high power analog combiner, and receiving the desired signal and providing feedback to the gain correction module and the phase correction module via an iterative amplitude and phase comparator.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the inventive concepts disclosed herein may be better understood by those skilled in the art by reference to the accompanying figures in which:

FIG. 8 is a flowchart for a method for interference cancellation exemplary of one embodiment of the inventive concepts disclosed herein.

DETAILED DESCRIPTION

Figure 1:
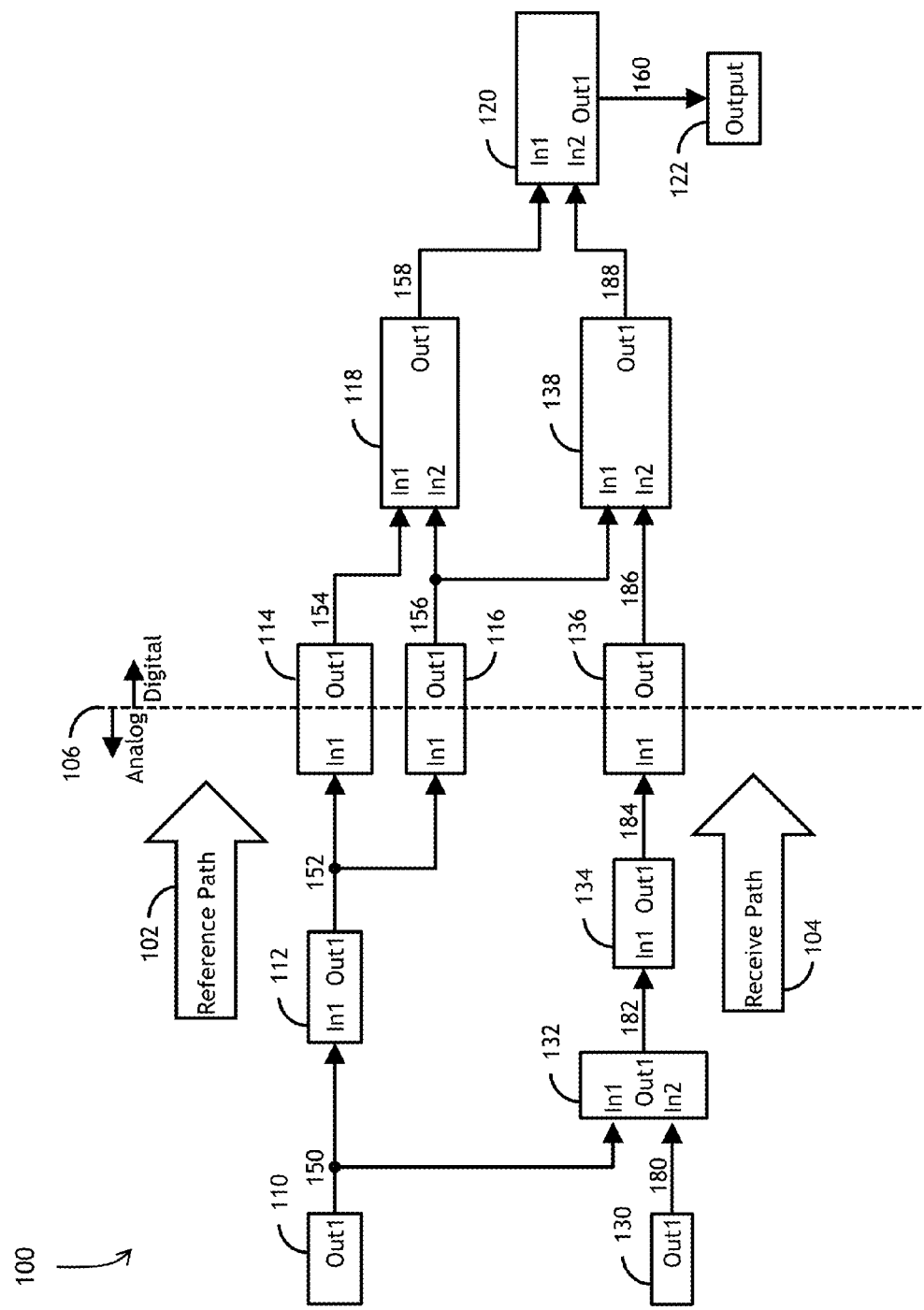
FIG. 1 is a diagram of an exemplary signal flow for an interference cancellation system in accordance with an embodiment of the inventive concepts disclosed herein.

Reference will now be made in detail to the presently preferred embodiments of the inventive concepts disclosed herein, examples of which are illustrated in the accompanying drawings. The following description presents certain specific embodiments of the inventive concepts disclosed herein. However, the inventive concepts disclosed herein may be embodied in a multitude of different ways as defined and covered by the claims. In this description, reference is made to the drawings wherein like parts are designated with like numerals throughout.

Overview

Embodiments of the inventive concepts disclosed herein are directed to a system and method for a high dynamic range interference canceller. The system may function as a full receiver of RF energy and provide cancellation of an undesirable signal allowing throughput of a desired signal to an existing radio capable of demodulation of the signal content. The system may support a dynamic operating range from a maximum interfering signal level to the on-channel noise floor by using a novel combination of analog and digital processing effectively cancelling 1) high-level interfering signal components, 2) low-level interfering noise, and 3) distortion components. The system employs an interrelated combination of cross-domain analog and digital processing techniques to defeat the inherent dynamic range limitations existing in each of the analog and digital domains. The resulting dynamic range achieved is significantly beyond that which can be achieved using either analog or digital techniques alone.

Whereas existing cancellation systems struggle with signals greater than +5 dBm, embodiments of the inventive concepts disclosed herein may compensate for and extract interference levels from +20 dBm to an exemplary +40 dBm at a receive system input while supporting full receive system sensitivity to the desired signal.

| Reference Chart | |
|---|---|
| Ref. | Description |
| 100 | System |
| 102 | Reference Path |
| 104 | Receive Path |
| 110 | Interfering Signal Source |
| 112 | Outer Band Pass Filtering (BPF) for Interfering Reference Signal |
| 114 | First Delay |
| 116 | Elimination of interference reference at desired signal frequency (plus inadvertent internally generated noise and distortion) |
| 118 | Extraction of interference reference at desired signal frequency (plus undesired noise and distortion) |
| 120 | Combiner |
|  | Subtraction of both |
|  | 1) Interfering Signals |
|  | 2) Undesired Noise and Distortion |
| 122 | Output Signal Destination |
| 130 | Desired Signal Source |
| 132 | RF Channel |
| 134 | Band pass Filter of Received Signals |
| 136 | Second Delay |
| 138 | Subtraction of wideband Interference Signal from Incoming RF (plus undesired noise and distortion) |
| 150 | Interfering Signal |
| 152 | Filtered Interfering Signal |
| 154 | Wideband Interference |
| 156 | Notched Wideband interference with Noise and Distortion |
| 158 | Narrowband Interference signal with noise and distortion |
| 160 | Desired Output Signal (desired signal on channel) |
| 180 | Desired Signal |
| 182 | Received signal (Desired signal plus Interfering Signal) |
| 184 | Filtered Received Signal |
| 186 | Desired Signal and Broadband Interference |
| 188 | Desired Signal and Narrowband Interference with noise and distortion |
| 190 | Low strength Desired Signal |
| 200 | Symmetric Interference Canceller |
| 202 | First Analog Combiner |
| 204 | First Band Pass Filter |
| 206 | First Distorting Mixer Down Convert |
| 208 | Delay Adjust |
| 210 | Third Band Pass Filter |
| 212 | First Analog to Digital Converter (ADC) - 400 Msps |
| 214 | First Phase Correction Subsystem and Delay |
| 216 | First Gain Correction Subsystem |
| 218 | Reference Low Noise Amplifier (LNA) |
| 220 | Reference Antenna element |
| 222 | Receive Antenna element |
| 230 | Second Gain Adjust |
| 232 | Second Analog Combiner |
| 234 | Second Band Pass Filter |
| 236 | Second Distorting Mixer Down Convert |
| 238 | Fixed Delay |
| 240 | Fourth Band Pass Filter |
| 242 | Second ADC |
| 244 | Second Phase Correction Subsystem and Delay |
| 246 | Second Gain Correction Subsystem |
| 248 | Receive LNA |
| 250 | Mixer Down Convert and Low Pass Filter (LPF) 0 Delay |

Reference Chart

| Ref. | Description |
| --- | --- |
| 252 | First Low Pass Filter |
| 254 | Third ADC |
| 256 | Digital Notch |
| 258 | Digital to Analog Converter (DAC) 3 |
| 260 | Analog Notch 0 Delay |
| 262 | Second Low Pass Filter |
| 264 | Distorting Mixer Up Convert |
| 266 | Third Gain Adjust |
| 268 | Fourth Gain Adjust |
| 270 | Oscillator |
| 272 | Anti-Alias Low Pass Filter |
| 274 | First gain adjust |
| 300 | Identical Signal Path Combining |
| 320 | Output Prior to final Combining |
| 330 | Output After Final Combining |
| 400 | Cancellation Curve Before and After Final Combination |
| 420 | Output Prior to Canceling |
| 430 | Output After Canceling |
| 500 | First Stage Analog/Digital Canceller |
| 510 | 1 × N Switch 1 |
| 512 | 1A BPF 1 |
| 514 | 1A BPF 2 |
| 516 | 1A BPF N |
| 518 | N × 1 Switch 1 |
| 520 | Switched Attenuator |
| 522 | Signal Splitter 1 |
| 528 | 1 × 3 Switch 1 |
| 530 | 1B BPF 1, BPF 2, BPF 3 |
| 532 | N × 3 Switch 1 |
| 536 | Narrow Intermediate Frequency (IF) BPF 1 |
| 538 | IM Coarse Delay Adjust |
| 540 | LNA 1 |
| 544 | BPF Digital 1 |
| 546 | Gain Correction |
| 548 | Phase Correction |
| 552 | Digital Gain Control |
| 554 | DAC 100 MHZ Output |
| 556 | Combiner 5 |
| 558 | Final BPF |
| 564 | LNA 3 |
| 568 | Digital Fine Delay Adjust |
| 570 | Digital Notch Filter 100 MHz |
| 578 | Low-Noise Amplifier (Hybrid Combined) |
| 580 | Signal Splitter 2 |
| 582 | Synthesizer (LO) |
| 584 | LNA 4 |
| 586 | Signal Splitter 3 |
| 600 | Second Stage Digital Canceller |
| 610 | 1 × N Switch 2 |
| 612 | 2A BPF 1 |
| 614 | 2A BPF 2 |
| 616 | 2A BPF N |
| 618 | N × 1 Switch 2 |
| 624 | 1 × 3 Switch 2 |
| 626 | N × 3 Switch 2 |
| 630 | 2B BPF 1, BPF 2, BPF 3 |
| 640 | LNA 2 |
| 644 | BPF Digital 2 |
| 646 | A to B Amplitude Compare |
| 648 | Iterative Amplitude and Phase Compare Feedback (optional) |
| 650 | A to B Phase Compare |
| 700 | Exemplary Application of System |
| 800 | Method for Interference Cancellation |

Referring to FIG. 1, a diagram of an exemplary signal flow for an interference cancellation system in accordance with an embodiment of the inventive concepts disclosed herein is shown. Conceptually, one goal of the system 100 may include removal of an interfering signal from a received signal (which includes both the interfering signal and a desired signal) to leave remaining only the desired signal. The concept of the system 100 may be carried out in three exemplary phases applied to a received signal: 1) an outer bandpass filter to remove energy outside of a desired frequency band, 2) determination and elimination of remaining energy that was within the outer bandpass, and 3) extraction and subtraction of the remaining interfering signal at the desired frequency.

Embodiments herein may operate in both analog phases and digital phases to enable the subtraction and extraction of an interfering signal from a desired signal. These transitions between analog and digital and vice versa may offer signal cancellation with a wide range of frequency bandwidths as well a wide range of input power.

In a simplified form, the system 100 may receive as inputs two separate signals including a desired signal 180 from a desired signal source 130 and an interfering signal 150 emanating from an interfering source 110. These desired and interfering signals may together form a received signal. For descriptive purposes, the interfering signal 150 may follow a reference path 102 while the received signal (including both the interfering signal and the desired signal) simultaneously follows a receive path 104.

Each of the receive path 104 and reference path 102 are filtered via an outer bandpass filter 112 for the interfering signal 150 to create a filtered interfering signal 152 and a band pass filter 134 for the received signal 182 to create a filtered received signal 184. To maintain a consistent signal flow throughout resulting in simultaneous signal arrival at each phase, the system 100 may delay each of the paths 102 and 104 at a first delay 114 and a second delay 136 while the system 100 eliminates the interference reference at a desired signal frequency. Each of the first delay 114 and the second delay 136 may be dissimilar to ensure simultaneous signal arrival at the following phase.

The system 100 may command each of the delays 114 and 136 to function as a dynamic delay to accommodate differences in filtering timing. For example, a broadband interfering signal maintaining a first set of time and phase distortions and proximal to the system 100 requiring lengthy filtering may require the system 100 to command a longer dynamic delay. Whereas a distant more narrow interfering signal may require the system 100 to command a shorter dynamic delay.

The system 100 "notching" of the interfering signal 150 in the reference path 102 at the desired frequency removes all components of the interfering signal 150 which might be present within the channel of the desired signal frequency. During this elimination phase 116, some inadvertent noise and distortion may be generated on-channel.

Each of the delays 114 and 136 results in a wideband interference signal 154 along the reference path 102 and a desired signal with broadband interference 186 along the receive path 104. Also, as each signal travels through the system 100, each signal may preferably align in time, in phase and in amplitude at each manipulation phase. For example, as the notched wideband interfering signal with noise and distortion 156 and desired signal with broadband interference 186 are summed in a subtraction phase 138, each signal must contemporaneously arrive in phase and with similar amplitude.

With the elimination phase 116, the system 100 creates a "notched" wideband interfering signal containing inadvertent noise and distortion 156. In the receive path 104, at a step 138, the system 100 subtracts this notched wideband interfering signal 156 from the receive path signals to leave a desired signal plus narrowband interference with noise and distortion 188 remaining. This subtraction phase 138 may be considered a first subtraction step to eliminate all of the wideband interfering signal interference outside of a narrow band of frequencies around the desired signal 180.

Also near this time, in the reference path 102, the system 100 extracts the interference reference at the desired signal frequency within an extraction phase 118 to produce a narrowband interference signal with noise and distortion 158 remaining.

The system 100 executes a final subtraction via a combiner 120 of the resultant reference path signals from the resultant receive path signals resulting in a cancellation of narrowband interference and cancellation of the inadvertent noise and distortion, leaving only the desired output signal 160 at the output of the system 100 available to an output signal destination 122.

Reference line 106 may indicate an exemplary reference line 106 between analog and digital components of the system 100. To the left of the reference line 106, analog components may function to combine and filter while digital components execute the system 100 tasks to the right of the reference line 106.

Through the active manipulation of the received 182 and interfering 150 signals, the system 100 creates, with these subtractions: 1) a relatively narrowband interfering signal(s) accompanied by the inadvertent noise and distortion 158 within the reference path 102, and 2) the desired signal accompanied by both the narrowband interfering signal(s) and the inadvertent noise and distortion 188 within the receive path 104. With this active manipulation of the signals with analog and digital elements, the system 100 may provide a near perfect cancellation of the interfering signal from the desired signal offering a clear desired output signal 160 available to an operator of the output signal destination 122.

Of note, embodiments of the inventive concepts disclosed herein need not significantly degrade a system noise figure. The incoming signal's RF path is not required to be digitized and the injection of the interfering signal's anti-phase components can be accomplished using circuitry capable of keeping the noise floor below that of the downstream communications receiver output signal destination 122.

The system 100 interference signal cancellation may offer a ten-fold improvement over traditional systems in interference immunity. The system 100 may operate to provide Communications and Connectivity while Jamming (C2WJ) improving operational performance of such radios as an ARC-210, Multifunctional Information Distribution System (MIDS)/Link-16, Tactical Targeting Network Technology (TTNT) and Global Navigation Satellite System (GNSS)/Global Positioning System (GPS).

In some embodiments, the system 100 may function with zero generation of internal destructive internal noise and distortion of notched wideband signal 156 and narrowband interference signal 158. In this manner, the system 100 may operate with zero degradation to the desired output signal 160 for demodulation at the output signal destination 122.

The system 100 may apply to and be specially configured for both commercial and military uses. For example, inventive concepts disclosed herein may facilitate resolution of collocated interference at airport installations having multiple high-power Air Traffic Control (ATC) transmitters operating in close proximity to the ATC receivers. In a military example, the system 100 may be configured and deployed on board an airborne jamming platform (e.g., F/A-18G) designed to jam enemy RF signals. During the jamming of a wide spectrum of RF energy, the airborne jamming platform may continue to receive GPS signals for accurate positioning information.

Figure 2:
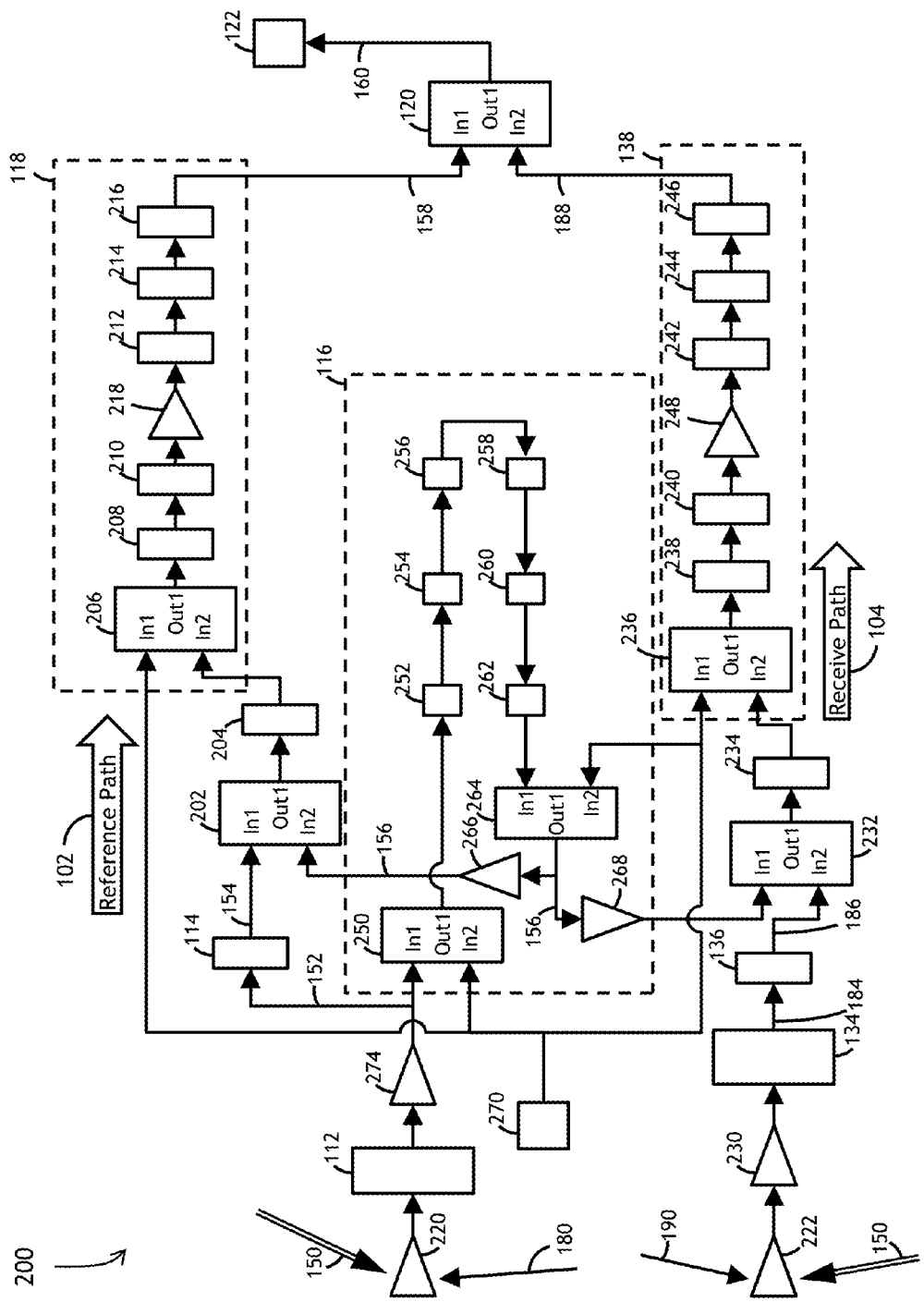
FIG. 2 is a diagram of a detail view of an exemplary symmetric embodiment of an interference cancellation system in accordance with an embodiment of the inventive concepts disclosed herein.

Referring to FIG. 2, a diagram of a detail view of an exemplary symmetric embodiment of an interference cancellation system in accordance with an embodiment of the inventive concepts disclosed herein is shown. In the below discussion of symmetric embodiment 200, various number values of elements included herein may be enumerated. These enumerated values may be exemplary only and operable based on a specific desired frequency. As each desired frequency may change, each of the enumerated values may change as well.

In cooperation with the elements described above, the symmetric embodiment 200 may indicate additional detail of the system 100 above. Interfering signal 150 and desired signal 180 are represented as individual inputs whereas in reality each signal may be received on a single or multiple antenna elements supplying both signals to each path 102 and 104.

A reference antenna element 220 may receive the received signal (including both the desired signal 180 and the interfering signal 150) and serve as the start of the reference path 102. Similarly, a receive antenna element 222 may receive a combined signal comprised of the interfering signal 150 and a lower strength desired signal 190 as the start of the receive path 104. The lower strength desired signal 190 may require greater processing for symmetric embodiment 200 to process. Thus, within the receive path 104, a second gain adjust 230 may operate to manipulate the gain of the received signal before further processing.

The symmetric embodiment 200 may employ a first distorting mixer down convert 206, a second distorting mixer down convert 236, a distorting mixer up convert 264 and ADCs 212, 254 and 242 but may require minimum delays to achieve signal contemporaneousness. Symmetry may provide one benefit of near-perfect cancellation over a wide dynamic range and immunity to internally generated intermodulation distortion (IMD) products and internally generated noise.

Detail of components 116 elimination of interference reference at desired signal frequency (plus inadvertent internally generated noise and distortion), extraction phase 118 of interference reference at desired signal frequency (plus undesired noise and distortion) and subtraction phase 138 of interfering signal from incoming RF (plus undesired noise and distortion) are indicated here.

First gain adjust 274 may operate to adjust and equalize the gain of each signal path (the reference path 102 and the receive path 104) as, in some cases, the anticipated power of the interfering signal 150 may be expected to be significantly greater than the power level of the desired signal 180. In other embodiments, the anticipated power of the interfering signal 150 may be equal to or less than the power of the desired signal 180. In some embodiments, a gain difference of 40 dB and greater may be realized between the interfering signal 150 and the desired signal 180.

The symmetric embodiment 200 may also operate to accept and manipulate signals of high input power levels not capable by traditional cancellation schemes. In some embodiments, the symmetric embodiment 200 may operate to receive and cancel signals designed for jamming a large scale combat area. For example, an aircraft configured for producing high power jamming interfering signals 150 designed to deny an enemy use of a specific spectrum may employ embodiments of the symmetric embodiment 200 to successfully receive a low power desired signals 180. This receive-while-jam capability may offer additional capabilities to the jamming aircraft.

The first delay 114 and the second delay 136 correspond directly to the same delay elements shown in FIG. 1 to ensure signals remain consistently temporally aligned throughout the system. Third gain adjust 266 and fourth gain adjust 268 may function as above to equalize (e.g., amplify and/or reduce) the narrowband interference signal with noise and distortion 156 as the signal is prepared for the next phase of manipulation.

A first analog combiner 202 and a second analog combiner 232 may operate to combine each analog signal prior to the combined signal entering the extraction phase 118 and the subtraction phase 138. Each of the analog combiners 202 and 232 may offer a high power capability to the symmetric embodiment 200 to increase a dynamic range capability of the symmetric embodiment 200 to receive a diverse array of input power. In some embodiments, the symmetric embodiment 200 may operate with an input dynamic range of 100 decibels or more.

In one embodiment, an oscillator 270 may operate to provide a phase equalization and delay compensation to each of the paths 102 and 104. As the symmetric embodiment 200 may preferably match a phase of each signal as each signal traverses each path 102 and 104, the oscillator may operate to keep the signals contemporaneously in phase. In one embodiment, the oscillator 270 is a 475 MHz phase compensating local oscillator.

The symmetric embodiment 200 may optionally employ first band pass filter 204 and second band pass filter 234 in each of the reference path 102 and the receive path 104 respectively. In some embodiments, each band pass filter is a 100 MHz bandpass filter operating at 375 MHz with a measurable delay.

The elimination phase 116 may include mixer down convert and low pass filter 250, first low pass filter 252, input third ADC 254, digital notch 256, DAC 258, analog notch 260, second low pass filter 262 and distorting mixer up convert 264. Each of the elements included in the elimination phase 116 may operate to produce notched wideband interference with noise and distortion signal 156. In one embodiment, first low pass filter 252 and second low pass filter 262 are 250 MHz LPF elements with a measurable delay.

Extraction phase 118 may include first distorting mixer down convert 206, delay adjust 208, third band pass filter 210, a reference Low Noise Amplifier (LNA) 218, first ADC 212, first phase correction subsystem 214 and first gain correction subsystem 216. Each of the elements included in the extraction phase 118 may operate to produce narrowband interference with noise and distortion signal 158.

Subtraction phase 138 may include the second distorting mixer down convert 236, fixed delay 238, a receive LNA 248, a fourth band pass filter 240, second ADC 242, second phase correction subsystem 244 and second gain correction subsystem 246. Each of the elements in the subtraction phase 138 may operate to produce desired signal inclusive of narrowband interference with noise and distortion 188.

The symmetric embodiment 200 may then employ the combiner 120 to, as above, subtract both interfering signals and undesired noise and distortion 158 from desired signal with narrowband interference, noise and distortion 188 to create a desired output signal 160. This clean desired output signal 160 may then be usable by a plurality of radio devices to receive desired information.

The symmetric embodiment 200 may enable an inherent immunity to internally generated IMD products and noise generated within an anti-phase path to preferably allow support of operation at high receiver input power levels. The symmetric embodiment 200 may tolerate an exemplary power level of the interfering signal 150 of +30 dBm (i.e., one watt) proximal to the receiver input while achieving full sensitivity on the receiving channel. While the symmetric embodiment 200 may generate IMD and noise within the canceller prior to cancellation, that IMD and noise originates at a single source and can therefore be cancelled out since it is applied equally to the two symmetric signal paths along reference path 102 and receive path 104. The amplified output of the mixer is applied equally to the symmetric signal paths along reference path 102 and receive path 104 and may be cancelled in the same manner, at the same time, using the same signal paths, as are externally generated signals.

With anticipated less than perfect symmetry available using various components which may exhibit anticipated variation, symmetric embodiment 200 may experience degraded cancellation but may remain within reasonable bounds for representative tolerances. For example, with an exemplary input channel filter offset by one percent relative to each of the paths 102 and 104, the symmetric embodiment 200 may experience achievable cancellation near band edges of approximately 70 dB.

One benefit of the symmetric embodiment 200 may include minimization of delay line requirements. Some traditional systems may require approximately 25 nanoseconds of cumbersome delay line, the symmetric embodiment 200 is preferable configured for a reduction of delay line requirement to between 5 and 10 nanoseconds, an amount more easily realized using exemplary small chip components rather than traditional bulky coaxial cable delay lines.

Figure 3:
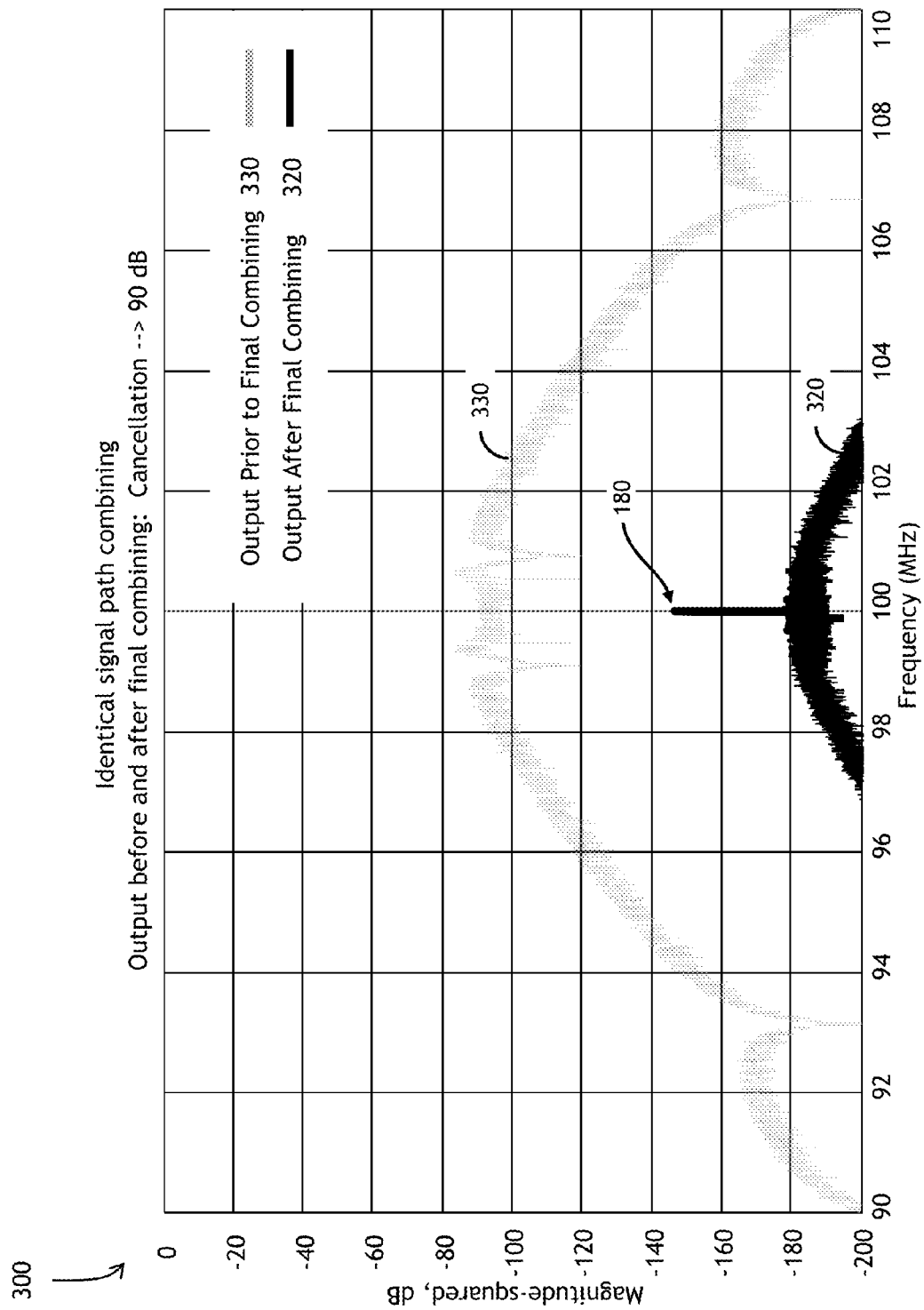
FIG. 3 is a graph of exemplary cancellation results across a broad spectrum before and after final combining in accordance with one embodiment of the inventive concepts disclosed herein.

Referring to FIG. 3, a graph of exemplary cancellation results across a broad spectrum before and after final combining in accordance with one embodiment of the inventive concepts disclosed herein is shown. The displayed cancellation achievement of an exemplary 90 dB across a broad spectrum when both signal paths were constructed using identical components in key functions.

An output before final combining 330 may indicate a remainder signal 158 and 188 (FIG. 1) after the system 100 performs the extraction phase 118 and the subtraction phase 138. An output after final combining 320 may indicate the desired output signal 160 after the system 100 performs subtraction phased within the combiner 120. At an exemplary desired frequency of 100 MHz, a spike in an output 322 may be indicated the desired signal 180 at the exemplary 100 MHz.

In one example, the system 100 may employ a super heterodyne approach to receive a desired signal 180 at 375 MHz and heterodyne the desired signal 180 with a 475 MHz signal to produce a difference of a desired signal 180 at 100 MHz. Since the desired signal 180 is of lesser magnitude (by, e.g., 50-90 dB) than that of the interfering signal 150, prior to the subtraction phase in the combiner 120, the desired signal 180 may be masked by the noise of the interfering signal 150 within a curve 330.

Of note; in subtraction phase within the combiner 120, an importance of the system 100 matching delays, phase and amplitude throughout the signal flow may be emphasized to allow each signal 158 and 188 to contemporaneously arrive at the combiner 120. This emphasis may allow accurate subtraction without residual artifacts from phase or amplitude differences between the interfering signal 150 and the desired signal 180.

Figure 4:
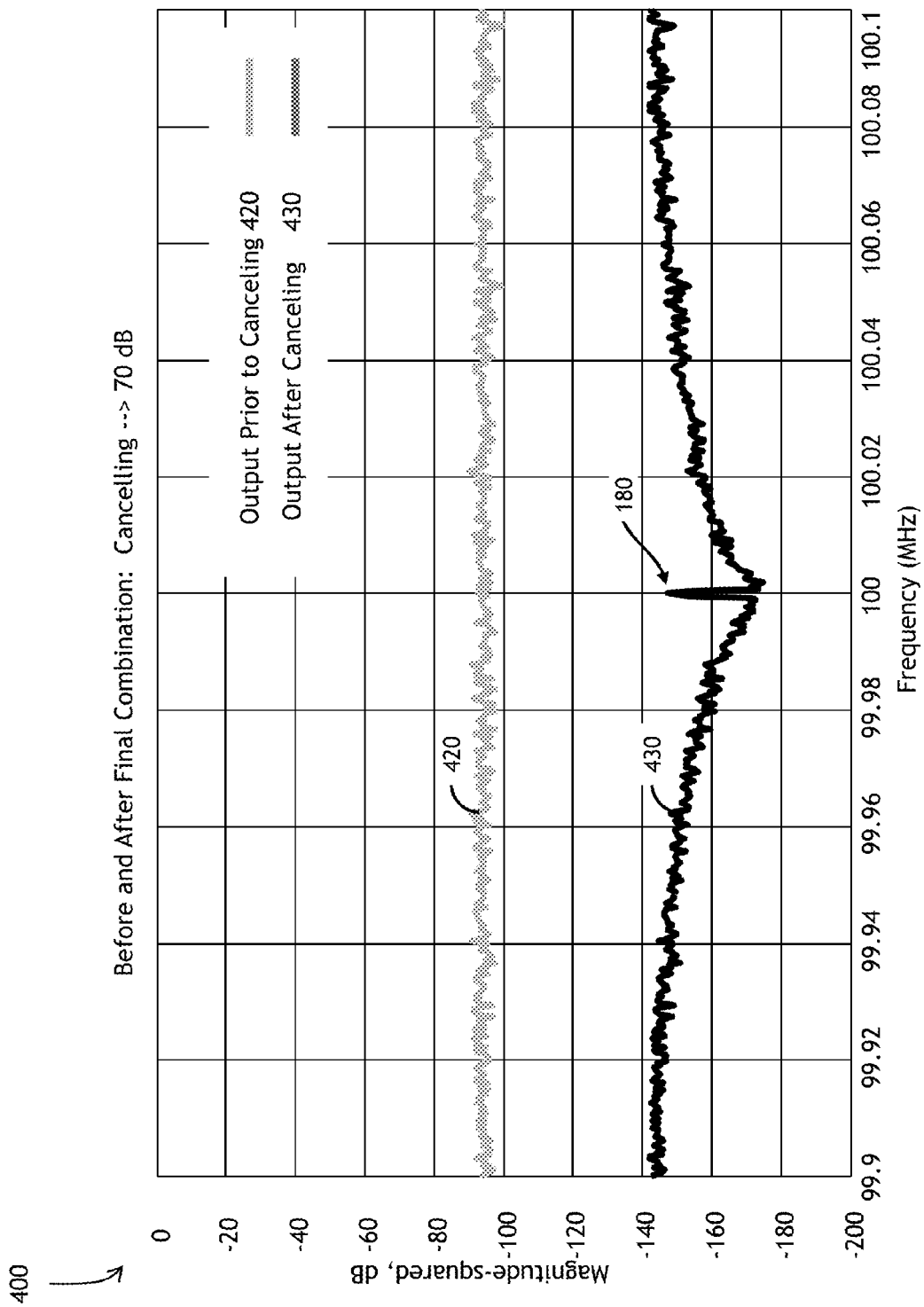
FIG. 4 is an graph of exemplary results possible before and after final combining in accordance with one embodiment of the inventive concepts disclosed herein.

Referring to FIG. 4, a graph of exemplary results possible before and after final combining in accordance with one embodiment of the inventive concepts disclosed herein is shown. Should the system 100 experience a mismatch in filters, a cancellation curve 400 may result from inconsistent amplitude or phase properties of each signal before combining.

A curve of an output prior to canceling 420 may indicate a level curve near an exemplary −95 dB while a curve of an output after canceling 430 may indicate a desired signal 180 near a desired frequency of 100 MHz as before. Here, the system 100 may realize an exemplary 70 dB of cancellation to reveal the desired signal 180.

Figure 5:
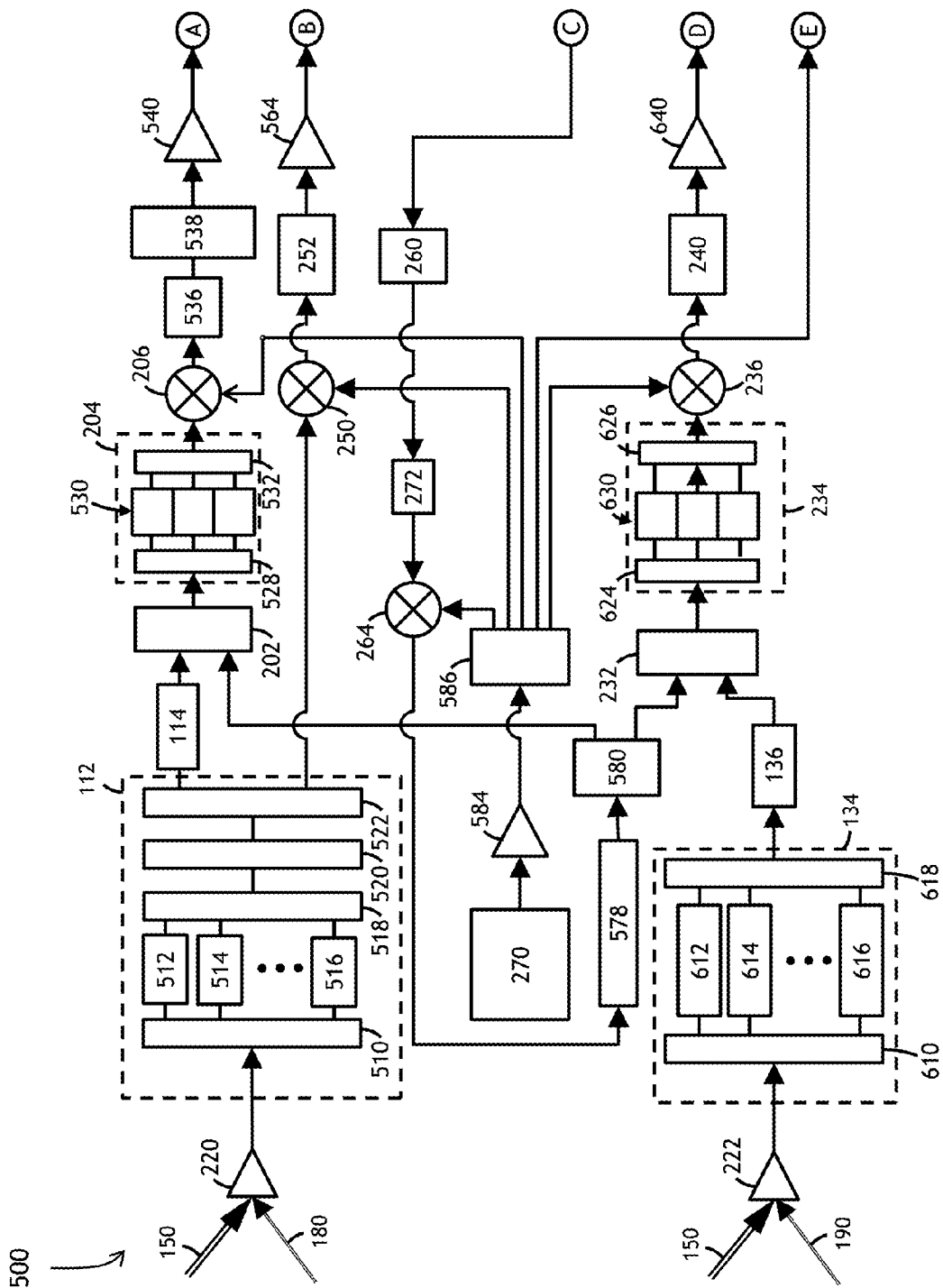
FIG. 5 is a diagram of an exemplary first stage digital analog interference cancellation system in accordance with one embodiment of the inventive concepts disclosed herein.

Referring to FIG. 5, a diagram of an exemplary first stage digital analog interference cancellation system in accordance with one embodiment of the inventive concepts disclosed herein is shown. The first stage digital analog interference cancellation system 500 may indicate greater detail of elements described in FIGS. 1 and 2. For example, embodiments of: band pass filter 112, first band pass filter 204, band pass filter 134 and second band pass filter 234 are shown in greater detail within FIG. 5.

In one embodiment, the first stage digital analog interference cancellation system 500 may include a band pass filter 112 with a plurality of BPF elements including BPF 1 512, BPF 2 514 and BPF N 516 configured for use via a 1×N switch 510 before and an N×1 switch 518 after the filter elements 512-516. For multiple frequency implementations, the first stage digital analog interference cancellation system 500 may vary the use of the plurality of BPF elements to adjust a filter of bandwidth around a desired frequency. Also, a switched attenuator 520 and a signal splitter 522 may be included within the band pass filter 112.

Similarly, a band pass filter 134 may optionally include a plurality of BPF elements including BPF 1 612, BPF 2 614 and BPF N 616 configured for use via a 1×N switch 610 before and an N×1 switch 618 after the filter elements 612-616.

The first bandpass filter 204 may optionally include a plurality of filter elements 530 as well as a 1×N switch 528 before and an N×1 switch 532 after the plurality of filter elements 530. In one embodiment, the plurality of filter elements 530 includes three filter elements and each of the switches may alternate between one or more of the three filter elements via a 1×3 switch and a 3×1 switch.

Similarly, a second band pass filter 234 may optionally include a plurality of filter elements 630 as well as a 1×N switch 624 before and an N×1 switch 626 after the plurality of filter elements 630. In one embodiment, the plurality of filter elements 630 includes three filter elements and each of the switches may alternate between one or more of the three filter elements 630 via a 1×3 switch and a 3×1 switch. In one embodiment, each of the first band pass filter 204 and the second band pass filter 234 may apply to a 100 MHz bandwidth.

Alternatively, one or more functions of band pass filters 112, 134, and band pass filters 204 and 234 may be replaced by a Micro-Electro-Mechanical System (MEMS) incorporated within the first stage digital analog interference cancellation system 500 to provide various filtering applications of signals.

The first stage digital analog interference cancellation system 500 may include a plurality of signal combiners including the first distorting mixer down convert 206, the second distorting mixer down convert 236, the mixer down convert and low pass filter 250, distorting mixer up convert 264 and a combiner 5 556 to appropriately combine the signals.

The first stage digital analog interference cancellation system 500 may also include a plurality of Low Noise Amplifiers (LNA) to equalize the amplitude of signals traversing the system. LNA 1 540, LNA 2 640, LNA 3 564 and LNA 4 582 may assist the first stage digital analog interference cancellation system 500 in signal power equalization for accurate cancellation of all but the desired signal 180.

The first stage digital analog interference cancellation system 500 may further include a narrow intermediate frequency BPF 1 536 and the fourth band pass filter 240 to further and more narrowly filter the signals. Also, to more accurately adjust the delay, the first stage digital analog interference cancellation system 500 may employ first low pass filter 252 as well as intermediate coarse delay adjust 538 before amplification. Here, a single synthesizer (a local oscillator) 582 may supply the first stage digital analog interference cancellation system 500 with the oscillating signal, split via signal splitter 3 586 and supplied to locations throughout the first stage digital analog interference cancellation system 500.

Each (one or both) of the reference antenna element 220 and the receive antenna element 222 may be traditional antenna elements as well as Electronically Scanned Array (ESA) antenna elements. The first stage digital analog interference cancellation system 500 may employ characteristics of the ESA antenna elements to enhance signal reception as well as directional reception.

Figure 6:
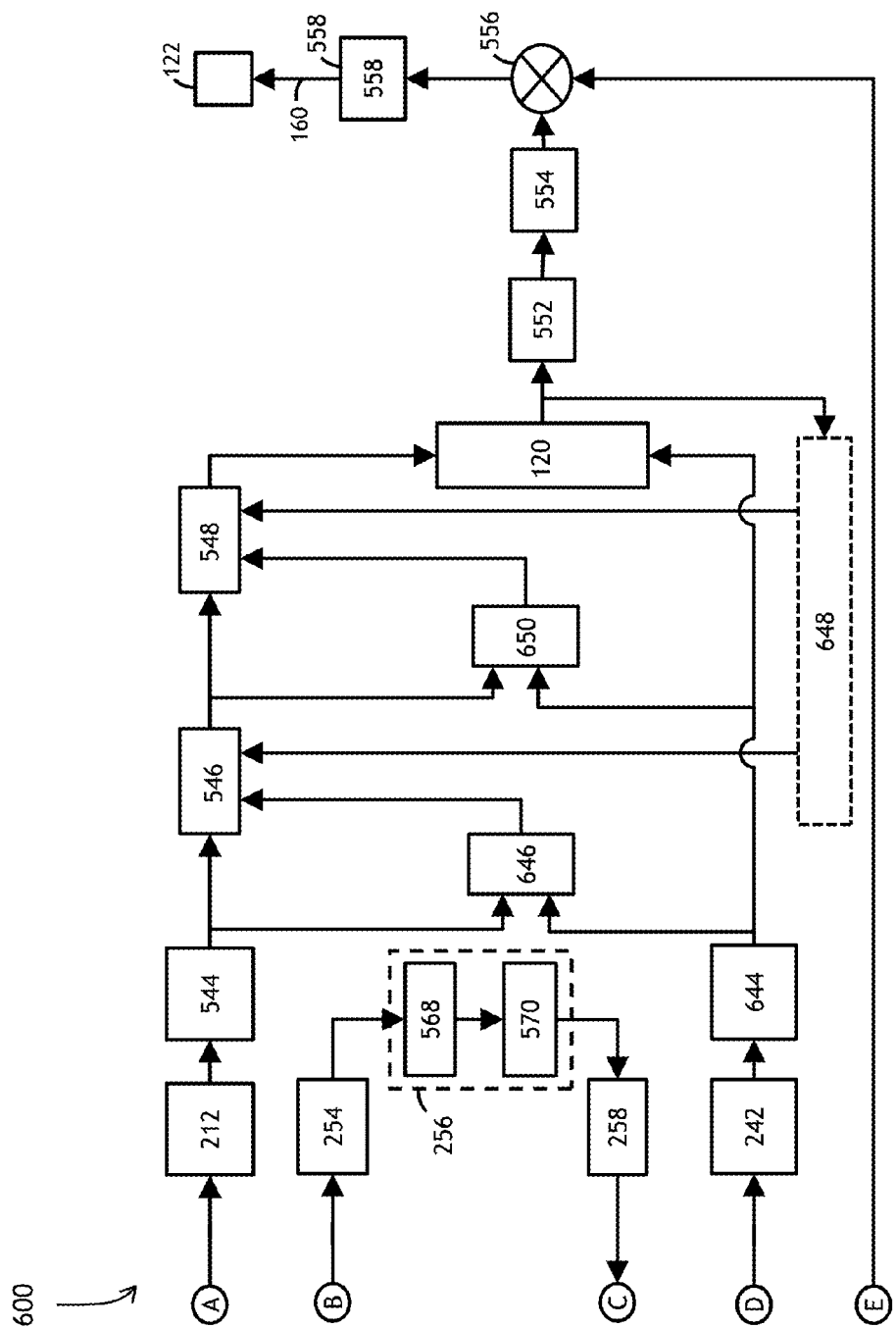
FIG. 6 is a diagram of an exemplary second stage digital interference cancellation system in accordance with one embodiment of the inventive concepts disclosed herein.

Referring to FIG. 6, a diagram of an exemplary second stage digital interference cancellation system in accordance with one embodiment of the inventive concepts disclosed herein is shown. The second stage digital canceller 600 may include converters including first ADC 212, second ADC 242 and third ADC 254 for conversion from analog to digital. A Digital to Analog Converter (DAC) 258 may convert from digital to analog for filtering by analog notch 260, filtered by anti-alias low-pass filter 272 and further combined via distorting mixer up convert 264 and a low noise amplifier combiner 578 and splitter 580. In one embodiment, third ADC 254 may operate at an exemplary 3.2 Giga Samples per Second (Gsps) allowing as fast conversion from analog to digital as possible.

Similar to the symmetric embodiment 200, the second stage digital canceller 600 may employ a digital notch 256 including digital fine delay adjust 568 and a digital notch filter 570 for notching around the desired signal 180. In one embodiment, the digital notch filter 570 may operate at 100 MHz to filter a wide band of frequency spectrum.

The second stage digital canceller 600 may also employ digital BPF 1 544 and digital BPF 2 644 to further filter the signals. After the digital BPFs 544 and 644, A to B amplitude compare 646 may determine any remaining amplitude adjustments necessary before mixing. A gain correction 546 may receive an input from A to B amplitude compare 646 and make the required gain correction. A to B phase compare 650 determines any remaining phase corrections necessary to the signals while phase correction 548 applies the necessary correction just before combining.

After combining the signals via the combiner 120, a digital gain control 552 may apply any gain correction while the DAC 554 may convert desired signal 180 back to analog for follow on use. A final BPF 558 may execute a final filtering for the desired output signal 160. In one embodiment, a combiner 5 556 may be unnecessary since some radios (e.g., a modem) may accept an intermediate frequency directly as an output from digital gain control 552 and perform the conversion (if required) to RF analog within the radio.

In one embodiment, an iterative amplitude and phase compare 648 feedback loop may provide the second stage digital canceller 600 with a feedback signal including the desired output signal 160 as an output from the combiner 120.

In one embodiment, an upper limit of a received signal 182 power handling in interference cancellation techniques may be determined by an amount of broadband noise generated by IMD within the canceller. Assuming a 4 dB noise figure in the downstream receiver and further assuming that the canceller exhibits a 100 MHz bandwidth, broadband noise within that 100 MHz bandwidth may not exceed −90 dBm, as calculated in the following table:

| | |
|---|---|
| Spectral spreading (100 MHz) | 80 dB * Hz |
| Receive noise floor (4 dB N.F.) | −170 dBm/Hz |
| Broadband input at noise floor | −90 dBm |
| Mixer OIP3 | 30 dBm |
| IIP3 to noise floor (IMD) | 120 dB |
| IIP3 backoff 3:1 slope (−120 IMD) | −40 dB |

Given the −90 dBm noise floor limit here, it may follow that backoff from a mixer's third-order intercept may be 40 dB, in this instance, to keep distortion products below an offending level. The 40 dB of backoff also indicates, as shown below, that a maximum mixer output level of −10 dBm may be available from a high-level mixer having an Output Intercept Point (OIP3) of +30 dBm before mixer generated distortion products significantly exceed the noise floor.

| | |
|---|---|
| Re-injection Mixer OIP3 | 30 dBm |
| Mixer backoff for −120 dB IMD | −40 dB |
| Output level at back-off | −10 dBm |

While −10 dBm would seem to be a rather low-level for re-injection of a cancelling signal the symmetric architecture of the first stage digital analog interference cancellation system 500 and the second stage digital interference cancellation system 600 may support appreciable downstream cancellation of noise and distortion on the re-injection signal, thereby allowing significant amplification of the desired signal 180. Assuming the first stage digital analog interference cancellation system 500 and the second stage digital interference cancellation system 600 may employ an amplifier gain of 40 dB, one result may yield a +30 dBm output level for cancelling interfering signals 150. Equivalently stated in a functional sense, first stage digital analog interference cancellation system 500 and the second stage digital interference cancellation system 600 may preferably support input levels up to +30 dBm under normal conditions.

| | |
|---|---|
| Amplifier gain | 40 dB |
| Canceller amp output level | 30 dBm |

Although exact mixer back-off requirements may vary among mixers from different manufacturers, one assumption here of 40 dB backoff from OIP3 to achieve a corresponding 3:1 reduction of 120 dB in IMD products may follow industry standard practice for OIP3 projections. To achieve moderately higher power handling, first stage digital analog interference cancellation system 500 and the second stage digital interference cancellation system 600 may alternatively support a parallelization of multiple mixers using quadrature-hybrid techniques to cancel approximately +30 dBm without needing additional architectural changes.

The IMD cautions above may apply equally to a receive side mixer in the canceller, as quantified in the following.

| | |
|---|---|
| Receive Mixer OIP3 | 30 dBm |
| Mixer backoff for −120 dB IMD | −40 dB |
| Mixer output at back-off | −10 dBm |
| Mixer loss | 7 dB |
| Mixer input at back-off | −3 dBm |
| 1st stage cancelling | 23 dB |
| Tolerable input power level | 20 dBm |

Again, significant back-off may be required. In this case though, the analysis indicates that after a modest amount of first-stage cancelling, 23 dB assumed here, first stage digital analog interference cancellation system 500 and the second stage digital interference cancellation system 600 may support higher input levels to approximately +20 dBm before mixer generated distortion products may become objectionable.

Of note: although parallel signal handling paths may likely generate similar levels of distortion, the origins, exact levels and phasing of the distortions may considerably vary, thus preventing first stage digital analog interference cancellation system 500 and the second stage digital interference cancellation system 600 significant controlled cancellation of the receive path mixer distortion products. First stage digital analog interference cancellation system 500 and the second stage digital interference cancellation system 600 may compensate here through minimization of the receive path distortion products rather than reliance on cancellation techniques.

In some embodiments, 20 dB or more of first stage digital analog interference cancellation system 500 interfering signal 150 cancellation may be anticipated while simultaneously providing full receiver sensitivity. Consequently, first stage digital analog interference cancellation system 500 and the second stage digital interference cancellation system 600 may support input power levels of +20 dBm while even higher levels of +30 dBm or more may likely result from additional attention in first stage cancellation.

Figure 7:
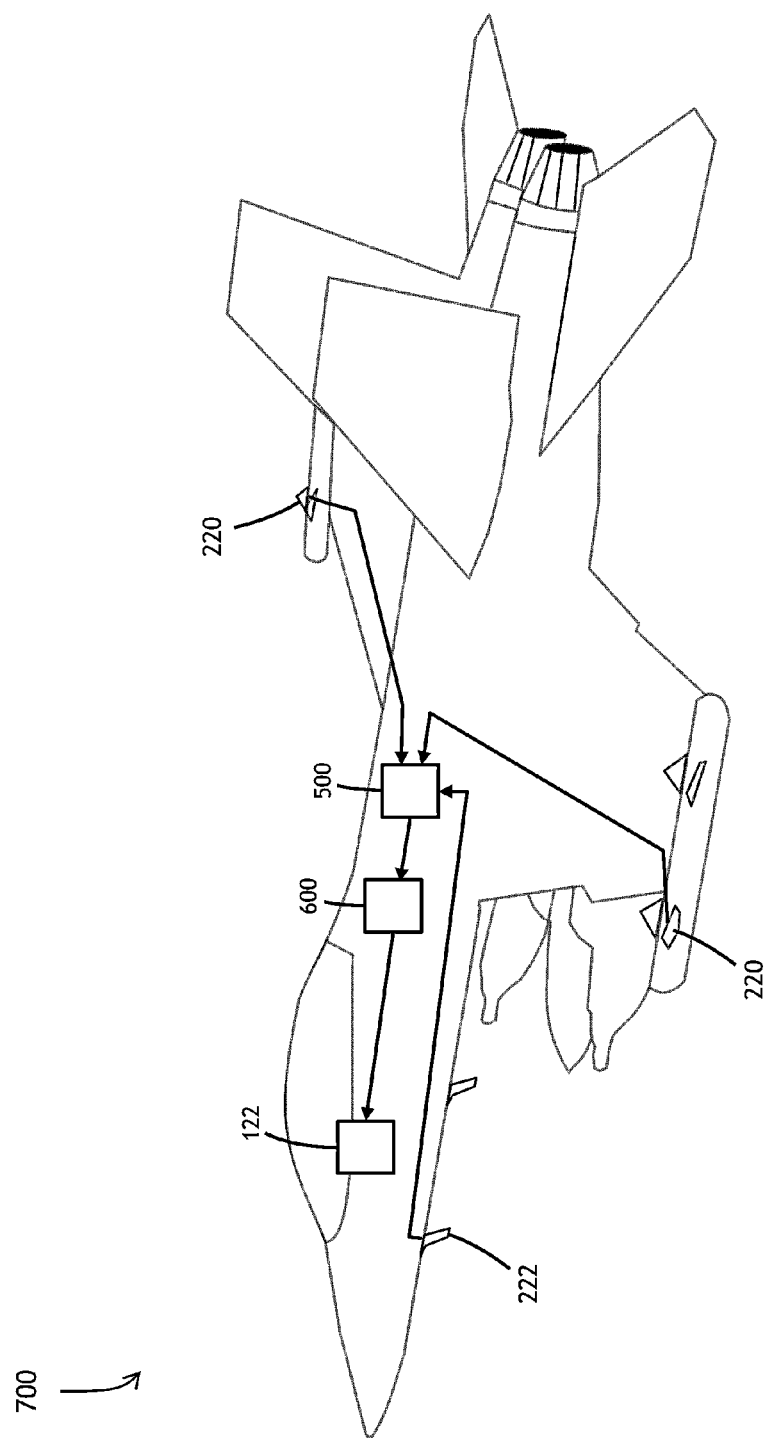
FIG. 7 is a diagram of an exemplary application of the interference cancellation system associated with one embodiment of the inventive concepts disclosed herein.

Referring to FIG. 7, a diagram of an exemplary application of the interference cancellation system associated with one embodiment of the inventive concepts disclosed herein is shown. Exemplary implementation 700 of system 100 may take the form of an airborne interference cancellation system sited onboard an F/A-18G Growler aircraft.

The receive antenna element 222 may be the normal RF antenna element for transmission and reception of RF energy for onboard voice communications. The reference antenna element 220 may optionally be located on a wingtip station of the Growler. The first stage digital analog interference cancellation system 500 and the second stage digital interference cancellation system 600 may be indicated onboard the aircraft as well as ARC-210 radio as the output signal destination 122 for transmission and reception of a plurality of operational signals.

In one embodiment of the inventive concepts disclosed herein, a firmware incorporation and/or a software incorporation of first stage digital analog interference cancellation system 500 and the second stage digital interference cancellation system 600 may function within the scope of the concepts herein. The systems described herein may employ a Software Defined Radio (SDR) to function to receive the signals and provide function within the scope of the inventive concepts disclosed herein.

Referring to FIG. 8, a flowchart for a method for interference cancellation exemplary of one embodiment of the inventive concepts disclosed herein is shown. The method 800 may include, at a step 802, receiving a received signal, the received signal comprised of a desired signal and an interfering signal, the received signal received via a first receiver defining a reference path and a second receiver defining a receive path, and at a step 804, with filtering the received signal within the reference path, the filtering producing a reference analog filtered received signal.

The method 800 may include, at a step 806, delaying the analog filtered received signal via at least one reference delay element, the at least one reference delay element having a variable delay based on at least a desired signal frequency, the at least one reference delay element receiving the reference analog filtered received signal and producing a wideband interference signal, and at a step 808, with eliminating an interference reference at the desired signal frequency via an elimination module within the reference path, the elimination module receiving the analog filtered received signal and producing a notched wideband interference signal.

The method 800 may include, at a step 810, with extracting an interference reference at the desired signal frequency via an extraction module within the reference path, the extraction module receiving each of the wideband interference signal and the notched wideband interference signal and producing a narrowband interference signal, and at a step 812, with filtering the received signal via at least one receive analog bandpass filtering element within the receive path, the filtering producing a receive analog filtered received signal.

The method 800 may include, at a step 814, with delaying the received signal via at least one receive delay element having a variable delay based at least on the desired signal frequency, the at least one receive delay element receiving the analog filtered received signal and producing a delayed received signal, and at a step 816, with subtracting the notched wideband interference signal from the delayed received signal via a subtraction module within the receive path, the subtraction module producing a desired signal inclusive of the narrowband interference signal.

The method 800 may conclude, at a step 818, with subtracting at least one of: the narrowband interference signal and a noise and distortion signal from the desired signal inclusive of the narrowband interference signal via a combiner, the combiner producing a desired output signal comprised of the desired signal without the interfering signal.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

Those having skill in the art will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the true spirit and scope of the subject matter described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

What is claimed is:

1. A system for large signal cancellation while allowing small signal reception, comprising:
   a first receiver defining a reference path for a received signal, the received signal comprised of a desired signal and an interfering signal, the reference path configured to route the interfering signal;
   a second receiver defining a receive path for the received signal, the receive path configured to route the received signal;
   the reference path including:
      at least one reference analog bandpass filtering element configured for filtering the received signal and producing a reference analog filtered received signal;
      at least one reference delay element, the at least one reference delay element having a variable delay based on at least a desired signal frequency, the at least one reference delay element configured for receiving the reference analog filtered received signal and producing a wideband interference signal;
      an elimination module configured for eliminating an interference reference at the desired signal frequency, the elimination module configured for receiving the analog filtered received signal and producing a notched wideband interference signal;
      an extraction module configured for extracting an interference reference at the desired signal frequency, the extraction module configured for receiving each of the wideband interference signal and the notched wideband interference signal and producing a narrowband interference signal;
   the receive path including:
      at least one receive analog bandpass filtering element configured for filtering the received signal and producing a receive analog filtered received signal;
      at least one receive delay element having a variable delay based at least on the desired signal frequency, the at least one receive delay element configured for receiving the receive analog filtered received signal and producing a delayed received signal;
      a subtraction module configured for subtracting the notched wideband interference signal from the delayed received signal, the subtraction module configured for producing a desired signal inclusive of the narrowband interference signal; and
   a combiner configured for subtraction of at least one of: the narrowband interference signal and a noise and distortion signal from the desired signal inclusive of the digital narrowband interference signal, the combiner producing a desired output signal comprised of the desired signal without the interfering signal.

2. The system of claim 1, wherein each of the at least one reference analog bandpass filtering element and the at least one receive analog bandpass filtering element further comprises: a plurality of individually switched bandpass filter elements, the plurality of individually switched bandpass filter elements switched based on the desired signal frequency.

3. The system of claim 1, wherein the at least one reference delay element and the at least one receive delay element further include a delay configured to temporally align each of the reference path and the receive path.

4. The system of claim 1, wherein the elimination module further comprises at least: an analog to digital converter, a digital fine delay adjust module, a digital notch filter, a digital to analog converter, an analog notch delay, and an analog elimination of the interference reference signal at the desired signal frequency.

5. The system of claim 1, wherein the system is configured for incorporation with an operational radio, the incorporated system is integrated with the operational radio and at least one of: shares a power source with the operational radio and operates before a demodulation phase within the operational radio.

6. The system of claim 1, wherein the at least one reference analog bandpass filtering element and the at least one receive analog bandpass filtering element are grouped within a first stage analog digital canceller.

7. The system of claim 1, wherein each of the reference path and the receive path further includes an amplitude comparator coupled with a gain correction module upstream of the combiner the amplitude comparator comparing an amplitude of a signal within the reference path with a signal within the receive path and wherein each of the reference path and the receive path further includes a phase comparator coupled with a phase correction module upstream of the combiner the phase comparator comparing a phase of the signal within the reference path with the signal within the receive path.

8. The system of claim 7, wherein the gain correction module and the phase correction module are grouped within a second stage digital canceller.

9. The system of claim 1, wherein the first receiver is a jammer mounted antenna element onboard an aircraft and the second receiver is a communication antenna element mounted onboard the aircraft.

10. The system of claim 1, further comprising a first high power analog combiner and a second high power analog combiner, each of the first and second high power analog combiner adding the notched wideband interference signal to at least one of the reference path and the receive path.

11. The system of claim 7, further including an iterative amplitude and phase comparator receiving the desired signal and providing feedback to the gain correction module and the phase correction module.

12. A method for large signal cancellation while allowing small signal reception, comprising:
receiving a received signal, the received signal comprised of a desired signal and an interfering signal, the received signal received via a first receiver defining a reference path and a second receiver defining a receive path;
filtering the received signal within the reference path, the filtering producing a reference analog filtered received signal;
delaying the analog filtered received signal via at least one reference delay element, the at least one reference delay element having a variable delay based on at least a desired signal frequency, the at least one reference delay element receiving the reference analog filtered received signal and producing a wideband interference signal;
eliminating an interference reference at the desired signal frequency via an elimination module within the reference path, the elimination module receiving the analog filtered received signal and producing a notched wideband interference signal;
extracting an interference reference at the desired signal frequency via an extraction module within the reference path, the extraction module receiving each of the wideband interference signal and the notched wideband interference signal and producing a narrowband interference signal;
filtering the received signal via at least one receive analog bandpass filtering element within the receive path, the filtering producing a receive analog filtered received signal;
delaying the received signal via at least one receive delay element having a variable delay based at least on the desired signal frequency, the at least one receive delay element receiving the analog filtered received signal and producing a delayed received signal;
subtracting the notched wideband interference signal from the delayed received signal via a subtraction module within the receive path, the subtraction module producing a desired signal inclusive of the narrowband interference signal; and
subtracting at least one of: the narrowband interference signal and a noise and distortion signal from the desired signal inclusive of the narrowband interference signal via a combiner, the combiner producing a desired output signal comprised of the desired signal without the interfering signal.

13. The method of claim 12, further including switching each of the at least one reference analog bandpass filtering element and the at least one receive analog bandpass filtering element via a plurality of individually switched bandpass filter elements, the plurality of individually switched bandpass filter elements switched based on the desired signal frequency.

14. The method of claim 12, further including temporally aligning each of the reference path and the receive path via at least one reference delay element and the at least one receive delay element.

15. The method of claim 12, further including cancelling the interfering signal before a demodulation phase within an operational radio, the cancelling including at least one of: incorporation within the operational radio and sharing a power source with the operational radio.

16. The method of claim 12, further including grouping each of the at least one reference analog bandpass filtering element and the at least one receive analog bandpass filtering element within a first stage analog digital canceller.

17. The method of claim 12, wherein each of the reference path and the receive path further includes an amplitude comparator coupled with a gain correction module upstream of the combiner, the amplitude comparator comparing an amplitude of a signal within the reference path with a signal within the receive path and wherein each of the reference path and the receive path further includes a phase comparator coupled with a phase correction module upstream of the combiner, the phase comparator comparing a phase of the signal within the reference path with the signal within the receive path.

18. The method of claim 17, further including grouping at least the gain correction module and the phase correction module within a second stage digital canceller.

19. The method of claim 12, further including receiving the received signal via a jammer mounted antenna element onboard an aircraft and via a communication antenna element mounted onboard the aircraft.

20. The method of claim 12, further comprising:
adding the notched wideband interference signal to at least one of the reference path and the receive path via at least a first high power analog combiner and a second high power analog combiner; and
receiving the desired signal and providing feedback to the gain correction module and the phase correction module via an iterative amplitude and phase comparator.

* * * * *